United States Patent
Elder et al.

(10) Patent No.: US 11,271,873 B2
(45) Date of Patent: Mar. 8, 2022

(54) OPERATING A SERVICE PROVIDER NETWORK NODE

(71) Applicant: Metaswitch Networks Ltd, Enfield (GB)

(72) Inventors: Alan Elder, Enfield (GB); Jon Harrison, Enfield (GB); Steve Balls, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

(21) Appl. No.: 16/912,530

(22) Filed: Jun. 25, 2020

(65) Prior Publication Data
US 2020/0412667 A1    Dec. 31, 2020

(30) Foreign Application Priority Data

Jun. 27, 2019  (GB) ..................................... 1909253

(51) Int. Cl.
*H04L 12/741* (2013.01)
*H04L 12/713* (2013.01)
(Continued)

(52) U.S. Cl.
CPC .......... *H04L 49/309* (2013.01); *H04L 45/021* (2013.01); *H04L 45/54* (2013.01); *H04L 45/586* (2013.01); *H04L 49/70* (2013.01)

(58) Field of Classification Search
CPC ..... H04L 49/309; H04L 45/021; H04L 45/54; H04L 45/586; H04L 49/70; H04L 43/10;
(Continued)

(56) References Cited

U.S. PATENT DOCUMENTS

| 9,049,148 B1 * | 6/2015 | Singh ...................... H04L 45/50 |
| 10,742,553 B1 * | 8/2020 | Thomas ................ H04L 45/745 |

(Continued)

FOREIGN PATENT DOCUMENTS

EP    3410651 A1    12/2018

OTHER PUBLICATIONS

Search Report for United Kingdom Patent Application No. 1909253. 5, dated Mar. 12, 2020, 3 pages.
(Continued)

*Primary Examiner* — Mohamed A Kamara
(74) *Attorney, Agent, or Firm* — Han Gim; Newport IP, LLC

(57) ABSTRACT

Certain aspects of the present disclosure provide a method of operating a service provider network node in a service provider network, comprising: establishing an interface between a control plane processing part and a data plane processing part for routing of control packets at the data plane processing part; at the control plane processing part, generating a control packet for routing through the service provider network; and at the control plane processing part, sending the control packet to the data plane processing part via the interface, to cause the data plane processing part to route the control packet through the service provider network using the one or more routing tables maintained by the data plane processing part in response to receiving the control packet from the control plane processing part via the interface.

22 Claims, 7 Drawing Sheets

(51) Int. Cl.
  *H04L 12/931* (2013.01)
  *H04L 49/00* (2022.01)
  *H04L 45/021* (2022.01)
  *H04L 45/00* (2022.01)
  *H04L 45/586* (2022.01)

(58) Field of Classification Search
  CPC ......... H04L 45/50; H04L 43/00; H04L 45/22; H04L 45/60
  See application file for complete search history.

(56) References Cited

U.S. PATENT DOCUMENTS

| | | | |
|---|---|---|---|
| 2009/0086644 A1 | 4/2009 | Kompella et al. | |
| 2016/0134542 A1* | 5/2016 | Raileanu | H04L 47/122 370/237 |
| 2016/0285735 A1* | 9/2016 | Chen | H04L 45/02 |
| 2019/0305988 A1* | 10/2019 | Bickhart | H04L 12/4633 |

OTHER PUBLICATIONS

"Office Action Issued in United Kingdom Patent Application No. 1909253.5", dated Sep. 6, 2021, 7 Pages.

\* cited by examiner

OPERATING A SERVICE PROVIDER NETWORK NODE

CROSS REFERENCE TO RELATED APPLICATIONS

This application claims priority to United Kingdom (GB) Application No. 1909253.5, filed Jun. 27, 2019, the entire contents of which are incorporated herein by reference.

INTRODUCTION

The present disclosure relates to operating a service provider network node. In particular, but not exclusively, the present disclosure relates to operating a service provider network node in a service provider network that provides connectivity between customer nodes of a customer network.

A customer (or enterprise) network may be divided across multiple, geographically distributed, sites. A service provider network can be used to provide connectivity between such sites, e.g. through use of a virtual private network (VPN). This is achieved by tunneling customer-originated traffic through the service provider network (which may, for example, be part of the public Internet). An example of a VPN that can be provided by a service provider is a layer 3 VPN, namely a VPN that is built and/or delivered using open systems interconnection (OSI) layer 3 networking technologies. Such a layer 3 VPN may be based on multiprotocol label switching (MPLS). Customer traffic in such cases may be tunneled through MPLS tunnels in the service provider network. The service provider is typically responsible for setting up the routing between the customer sites and for maintaining the VPN service. In such VPNs, customer edge (CE) nodes that are owned and managed by the customer are connected to provider edge (PE) nodes, which are owned and managed by the service provider.

Routing of packets between customer sites may be performed using routing tables, such as virtual routing and Forwarding (VRF) tables. A PE node can create and maintain a separate routing table (e.g. VRF table) for each VPN. A PE node may comprise a control plane processing part, and a separate data plane processing part. The control plane processing part and the data plane processing part may be provided on separate physical processors, in some cases. The control plane processing part may be responsible for setting up the routing tables and/or providing other control functionality. The data plane processing part may store the routing tables and perform look-ups in the routing tables to route customer-originated traffic for forwarding across the service provider network.

It may be desirable for a service provider network node to be able to send locally-originated control packets to other nodes in the context of the VRF. For example, it may be desirable for a first PE node to test the connectivity and/or reachability of a CE node that is connected to a second, different PE node. This may require the ability for the control plane processing part of the first PE node to generate packets with an appropriate MPLS label stack, and to route such packets correctly. However, routing processes may be relatively complicated and/or computationally expensive. Routes may also be difficult and/or inefficient for the control plane processing part to manage, store and/or update. This can impact performance, and may require a relatively large amount of state in the control plane processing part.

It is therefore desirable to provide improved methods for operating service provider network nodes.

BRIEF SUMMARY

According to a first aspect, there is provided a method of operating a service provider network node in a service provider network, the service provider network providing connectivity between at least a first customer network node and a second customer network node of a customer network, the service provider network node comprising: a control plane processing part; and a data plane processing part, separate from the control plane processing part, the data plane processing part being operable to maintain one or more routing tables for routing traffic through the service provider network, the method comprising: establishing an interface between the control plane processing part and the data plane processing part for routing of control packets at the data plane processing part; at the control plane processing part, generating a control packet for routing through the service provider network; and at the control plane processing part, sending the control packet to the data plane processing part via the interface, to cause the data plane processing part to route the control packet through the service provider network using the one or more routing tables maintained by the data plane processing part in response to receiving the control packet from the control plane processing part via the interface.

According to a second aspect, there is provided an apparatus comprising at least one processor and at least one memory including computer program code, the at least one memory and the computer program code being configured to, with the at least one processor, cause the apparatus at least to perform a method for operating a service provider network node in a service provider network, the service provider network providing connectivity between at least a first customer network node and a second customer network node of a customer network, the service provider network node comprising: a control plane processing part; and a data plane processing part, separate from the control plane processing part, the data plane processing part being operable to maintain one or more routing tables for routing traffic through the service provider network, the method comprising: establishing an interface between the control plane processing part and the data plane processing part for routing of control packets at the data plane processing part; at the control plane processing part, generating a control packet for routing through the service provider network; and at the control plane processing part, sending the control packet to the data plane processing part via the interface, to cause the data plane processing part to route the control packet through the service provider network using the one or more routing tables maintained by the data plane processing part in response to receiving the control packet from the control plane processing part via the interface.

According to a third aspect, there is provided a computer program product comprising a non-transitory computer-readable storage medium having computer-readable instructions stored thereon, the computer-readable instructions being executable by a computerized device to cause the computerized device to perform a method of operating a service provider network node in a service provider network, the service provider network providing connectivity between at least a first customer network node and a second customer network node of a customer network, the service provider network node comprising: a control plane processing part; and a data plane processing part, separate from the control plane processing part, the data plane processing part being operable to maintain one or more routing tables for routing traffic through the service provider network, the method comprising: establishing an interface between the control plane processing part and the data plane processing part for routing of control packets at the data plane processing part; at the control plane processing part, generating a control packet for routing through the service provider network; and at the control plane processing part, sending the control packet to the data plane processing part via the interface, to cause the data plane processing part to route the control packet through the service provider network using the one or more routing tables maintained by the data plane processing part in response to receiving the control packet from the control plane processing part via the interface.

According to a fourth aspect, there is provided a service provider network node in a service provider network, the service provider network providing connectivity between at least a first customer network node and a second customer network node of a customer network, the service provider network node comprising: a control plane processing part; and a data plane processing part, separate from the control plane processing part, the data plane processing part being operable to maintain one or more routing tables for routing traffic through the service provider network, wherein the control plane processing part is configured to: establish an interface between the control plane processing part and the data plane processing part for routing of control packets at the data plane processing part; generate a control packet for routing through the service provider network; and send the control packet to the data plane processing part via the interface, and wherein the data plane processing part is configured to: in response to receiving the control packet from the control plane processing part via the interface, route the control packet through the service provider network using the one or more routing tables maintained by the data plane processing part.

According to a fifth aspect, there is provided a method of operating a service provider network node in a service provider network, the service provider network providing connectivity between at least a first customer network node and a second customer network node of a customer network, the service provider network node comprising: a control plane processing part; and a data plane processing part, separate from the control plane processing part, the data plane processing part being operable to maintain one or more routing tables for routing traffic through the service provider network, the method comprising: at the control plane processing part, generating a control packet for routing through the service provider network; and at the control plane processing part, sending the control packet to the data plane processing part via an interface between the control plane processing part and the data plane processing part, to cause the data plane processing part to route the control packet through the service provider network using the one or more routing tables maintained by the data plane processing part in response to receiving the control packet from the control plane processing part via the interface, wherein the control packet is inserted by the control plane processing part into an existing ingress interface between the first customer network node and the data plane processing part, the existing ingress interface being operable to receive traffic from the first customer network node.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 1:
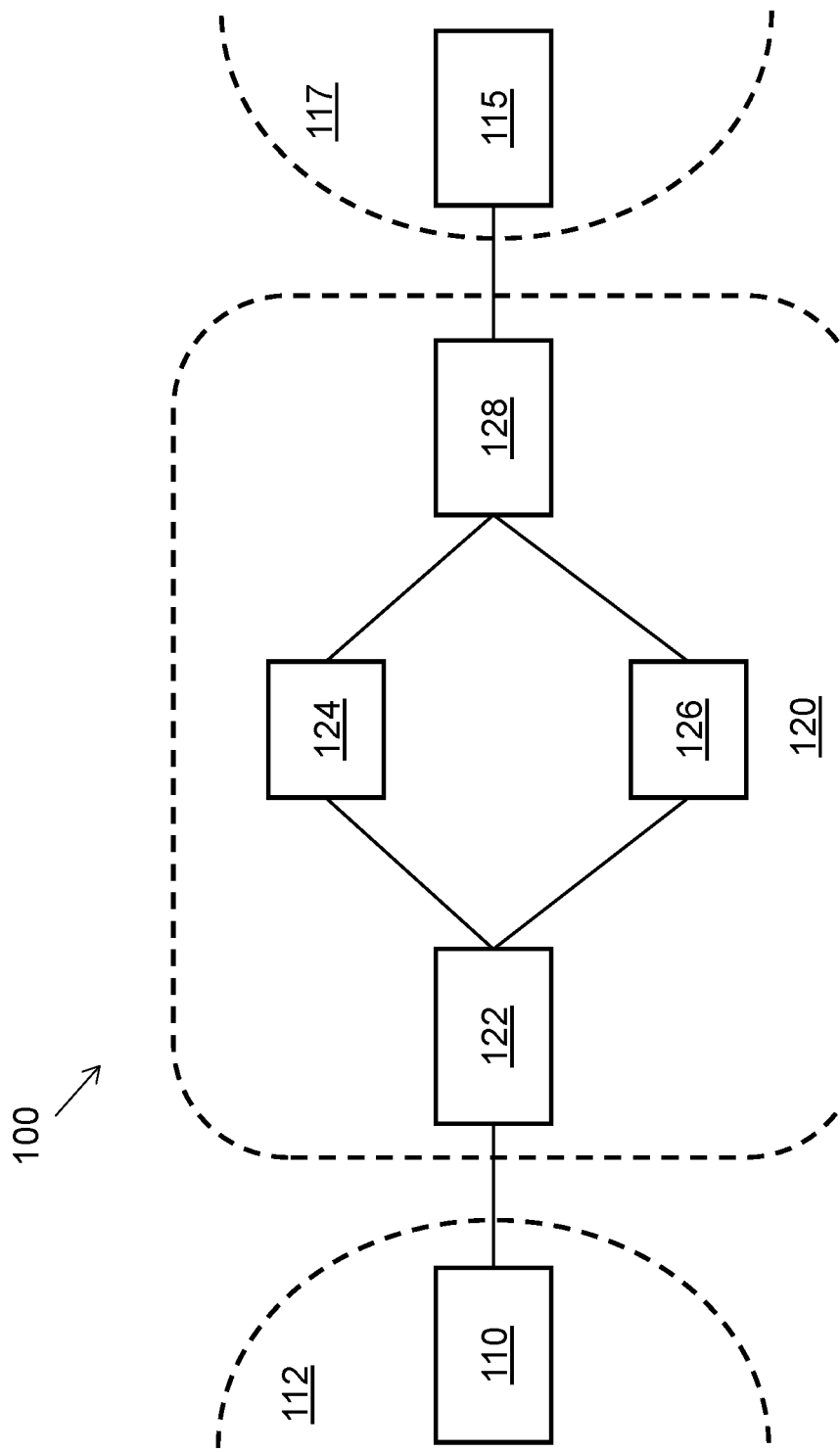
FIG. 1 shows a schematic view of an environment according to embodiments of the present disclosure.

Referring to FIG. 1, there is shown an environment 100, according to embodiments. The environment 100 includes a first customer network node 110 and a second customer network node 115. The first customer network node 110 is in a first part 112 of a first customer network, and the second customer network node 115 is in a second part 117 of the customer network. The two parts 112, 117 of the customer network are geographically separated, according to embodiments. That is, the first and second customer network nodes 110, 115 are located at different customer sites. As such, the second customer network node 115 is arranged at a remote location relative to the first customer network node 110. In alternative embodiments, the two parts 112, 117 of the customer network are co-located. Therefore, in such embodiments, the first and second customer network nodes 110, 115 may be located at a same site. The first and second customer network nodes 110, 115 may be unable to directly communicate with one another (e.g. due to being located at different sites). In embodiments, the first customer network node 110 and/or the second customer network node 115 comprises a customer edge (CE) node (also referred to as a CE device). The first customer network node 110 and/or the second customer network node 115 may comprise other types of customer nodes in alternative embodiments.

A service provider network 120 provides connectivity between the first customer network node 110 and the second customer network node 115. In embodiments, the service provider network 120 is used to establish a virtual private network (VPN). The VPN may be a border gateway protocol/multiprotocol label switching (BGP/MPLS) layer 3 VPN, for example. This allows customer internet protocol (IP) traffic to be tunnelled through the service provider network 120 (e.g. through MPLS tunnels), thereby providing connectivity between the customer network nodes 110, 115. In embodiments, at least a part of the service provider network 120 is part of the public internet.

The service provider network 120 comprises a first provider edge (PE) node 122 and a second PE node 128. PE nodes may also be referred to as PE devices. The PE nodes 122, 128 are examples of service provider network nodes. The first PE node 122 is directly connected (or logically adjacent) to the first customer network node 110. That is, the first customer network node 110 is attached or connected, to the service provider network 120 via the first PE node 122. The second PE node 128 is connected, or attached, to the second customer network node 115. The service provider network 120 further comprises intermediate nodes 124, 126. The intermediate nodes 124, 126 are also examples of service provider network nodes. Each of the intermediate nodes 124, 126 may relate to (e.g. form part of) a different route through the service provider network 120 between the first PE node 122 and the second PE node 128. That is, a first route from the first PE node 122 to the second PE node 128 may be via a first intermediate node 124, and a second route from the first PE node 122 to the second PE node 128 may be via a second intermediate node 126. The service provider network 120 may comprise different numbers of nodes, devices and/or routes in alternative embodiments.

Each of the service provider network nodes 122, 124, 126, 128 may be configured to implement one or more of the methods described below.

Figure 2:
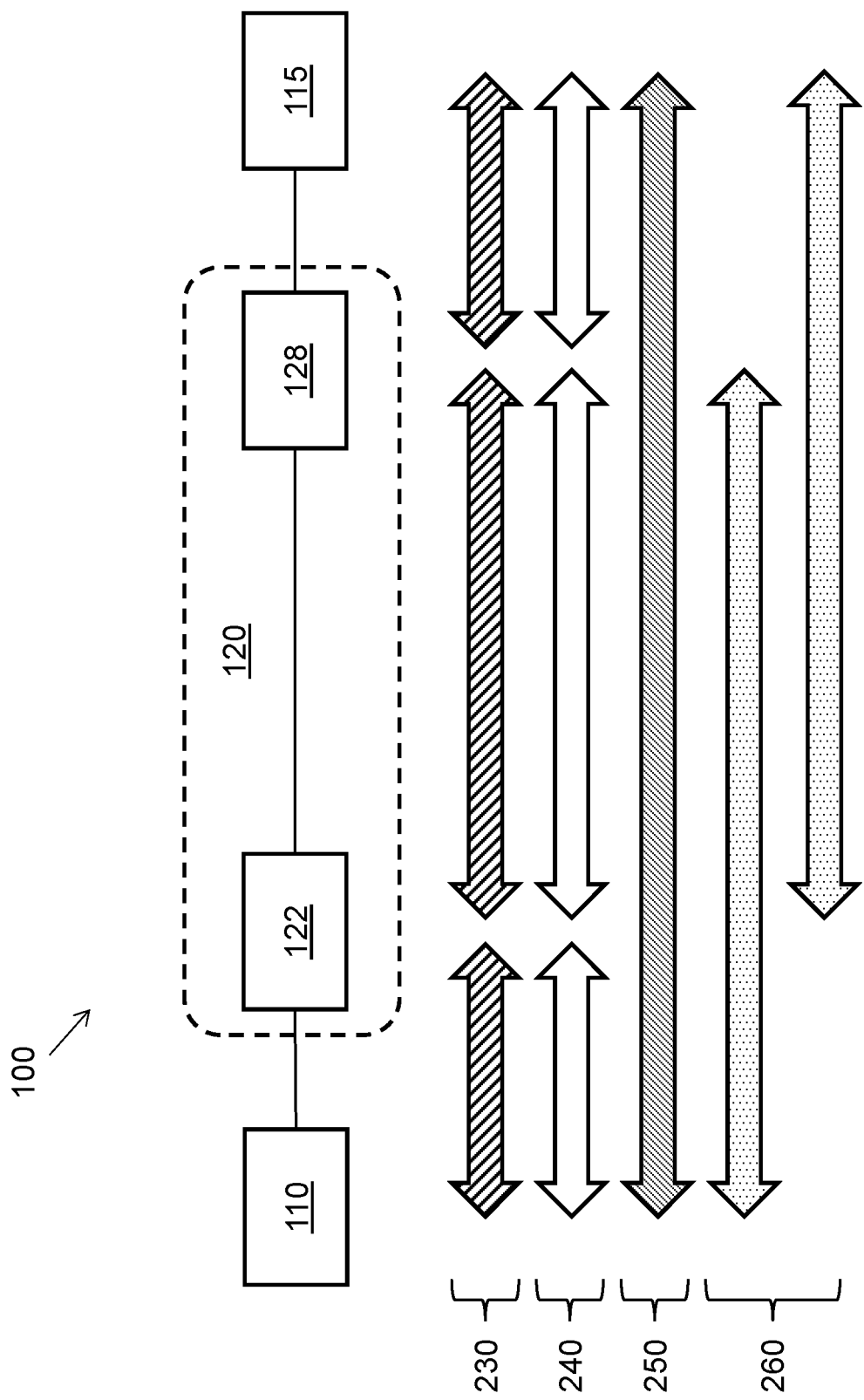
FIG. 2 shows a schematic view of an environment according to embodiments of the present disclosure.

Referring to FIG. 2, there is shown schematically examples of signalling mechanisms in the environment 100.

A first signalling mechanism 230 is for sending customer-originated traffic across the service provider network 120. Traffic is sent via layer 3 routing between the first CE node 110 to the first PE node 122, before being tunneled through the service provider network 120 using "MPLS tunneling" (which could be set up by, for example, label distribution protocol (LDP) or resource reservation protocol (RSVP)) tunneling to the second PE node 128, and then sent via layer 3 routing from the second PE node 128 to the second CE node 115.

A second signalling mechanism 240 is for testing connectivity between each CE node 110, 115 and the respective PE node to which the CE node is directly connected, via IP ping messaging. The first PE node 122 can also test connectivity with the second PE node 128 using a VRF LSP-ping mechanism. Using this mechanism, the sender, for example the first PE node 112, generates an MPLS Echo request packet, containing an MPLS label stack, with a recipient of the second PE node 128. This is forwarded using MPLS label switching to the destination, i.e. the second PE node 128. The destination performs some state checking, e.g. checking the state of a route in one of its VRFs, before sending an IP packet as a response back to the originating node.

A third signalling mechanism 250 is for testing connectivity between the CE nodes 110, 115, using IP ping messaging. In this mechanism, the sender generates an Internet Control Message Protocol (ICMP) ping request packet, which is a specific format of IP packet. This packet is then routed through the service provider network to a destination node in order to test routing and connectivity between the sending node, and a recipient node. The receiving node then sends an ICMP ping response, which is again a standard IP packet. Any intermediate nodes forward the packets using standard IP routing. Thus, if service provider node 122 is aware that connectivity to CE node 110 is good, and wishes to check connectivity to CE node 115, it could generate an ICMP ping request packet which would be sent, for example, via network nodes 124, 128, and received by the CE node 115. The CE node 115 would then generate a response packet and send it via the inverse route. Upon receipt of this packet, the service provider node 122 could conclude connectivity to the CE node 115 was in a good state, as the CE node 115 must have received the request in order to know to generate the response, which has now been received. Many ICMP ping request packets may be sent sequentially, and then both individual responses correlated, and the number of successful responses analysed, to get an overview of intermittent or periodic problems that may exist on the network by assessing which fail, and which succeed.

A fourth signalling mechanism 260 is for testing connectivity between a PE node and a CE node that is not directly connected to that PE node. For example, the fourth signalling mechanism 260 tests connectivity between the first CE node 110 and the second PE node 128, and/or between the first PE node 122 and the second CE node 115. This signalling mechanism 260 is addressed by embodiments described herein.

Figure 3:
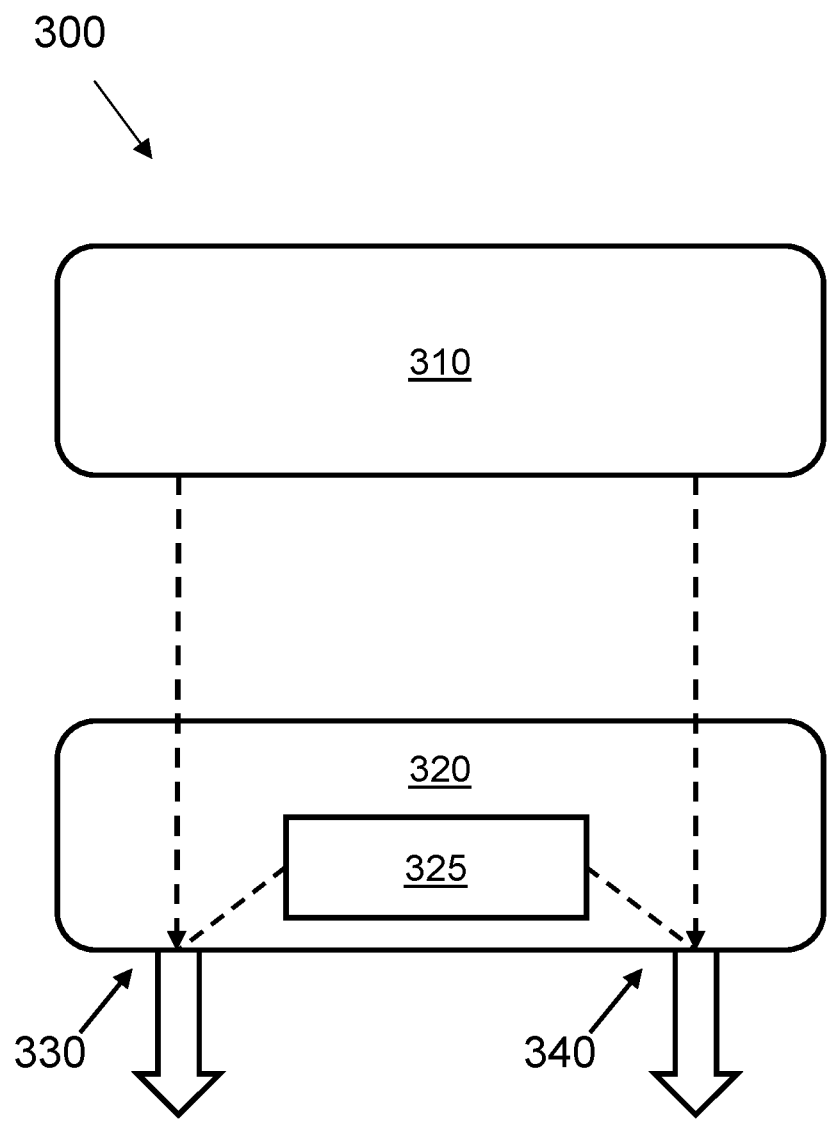
FIG. 3 shows a schematic view of a service provider network node according to embodiments of present disclosure.

Referring to FIG. 3, there is shown schematically a service provider network node 300 according to embodiments. In embodiments, the service provider network node 300 comprises a PE node, such as the first PE node 122 or the second PE node 128 described above. In alternative embodiments, the service provider network node 300 comprises an intermediate service provider network node.

The service provider network node 300 comprises a control plane processing part 310 and a data plane processing part 320. The control plane processing part 310 and the data plane processing part 320 may be implemented on separate processors, or on the same processor. Providing the control plane processing part 310 and the data plane processing part 320 on separate processors may be beneficial due to the different requirements and/or roles of the different processing parts during operation of the service provider network node 300. For example, the control plane processing part 310 may be involved in calculating routes (e.g. using one or more routing protocols), testing connectivity, coordinating updates, etc., whereas the data plane processing part 320 may be responsible for routing and forwarding traffic through the service provider network at a high throughput and/or frequency. The control plane processing part 310 and/or the data plane processing part 320 may be implemented as hardware and/or software. In embodiments, the control plane processing part 310 is implemented on a processor running Linux. The data plane processing part 320 may be provided on dedicated hardware for routing and forwarding traffic through the service provider network.

The data plane processing part 320 comprises egress interfaces 330, 340 (also referred to as outgoing interfaces). In embodiments, the egress interfaces 330, 340 comprise physical interfaces. The egress interfaces 330, 340 may comprise wired and/or wireless interfaces. In embodiments, the egress interfaces 330, 340 comprise logical and/or functional interfaces. The egress interfaces 330, 340 are for sending outgoing packets (or other data) to other network nodes (e.g. customer network nodes and/or other service provider network nodes). The data plane processing part 320 may be configured with different egress interfaces for different network nodes that are logically adjacent to the service provider network node 300. In embodiments, data plane processing part 320 comprises more egress interfaces than egress interfaces 330, 340.

The data plane processing part 320 comprises a routing processing pipeline 325. In embodiments, the routing processing pipeline 325 comprises a layer 3 routing processing pipeline 325. The routing processing pipeline 325 is configured to perform routing of received packets to/from customer network nodes, e.g. through the service provider network. The routing processing pipeline 325 is configured to pass routed packets for transmission via one or more of the egress interfaces 330, 340.

In embodiments, the routing processing pipeline 325 comprises one or more routing tables (not shown). An example of a routing table is a VRF table. Other types of routing table may be used in other embodiments. The routing tables are maintained and/or used by the data plane processing part 320 to route received packets through the service provider network. In embodiments, the control plane processing part 310 also comprises one or more routing tables (not shown).

The data plane processing part 320 of the service provider network node 300 may also be responsible for adding tunnel encapsulation, or labelling, to customer-originated packets that are to be routed through the service provider network. Such labelling may comprise MPLS labelling, for example. Tunnelled packets in the service provider network may use two MPLS labels. An outer label identifies the underlying label switched path (LSP) to a remote service provider node (e.g. a remote PE node) and is used to tunnel the packet through the service provider network to the remote service provider node. An inner label maps the packet to a given VPN. Customer-originated packets having such an inner label are passed to the VRF table that corresponds to the given VPN, so that they can be routed to the appropriate customer network node.

It may be desirable for the control plane processing part 310 to be able to send locally-originated packets to other network nodes (e.g. customer network nodes and/or other service provider network nodes). "Locally-originated" or "locally-generated" as used herein refers to packets that are generated at the service provider network node 300, instead of packets that are received from another node.

One method of enabling the control plane processing part 310 to send locally-originated packets involves configuring the control plane processing part 310 with routing tables which mirror those of the data plane processing part 320. Routes in the routing tables of the control plane processing part 310 refer to the egress interfaces 330, 340 of the data plane processing part 320. For example, a route in a control plane routing table may be: "10.1.1.0/24 via 'ge1', next hop 10.2.2.1", where 'ge1' refers to a particular egress interface of the data plane processing part 320. As such, the control plane processing part 310 routes a generated packet using its own routing tables, determines which of the egress interfaces 330, 340 of the data plane processing part 320 the generated packet is to be sent from, and sends the packet directly to the determined egress interface of the data plane processing part 320. The data plane processing part 320 is therefore not substantively involved in the routing process for locally-originated packets.

The control plane processing part 310 also adds the MPLS label stack to the generated packet (including both an inner, VRF label, and an outer, LSP label). This enables the generated packet to be sent via the correct path through the service provider network, from the correct egress interface of the data plane processing part 330. For example, if the control processing part 310 of a PE node is to send an IP ping message to a CE node that is connected to another PE node (thereby requiring the IP ping message to be routed through the service provider network), the routing table on the control processing part 310 for the relevant VPN requires a route for the IP address of the CE node which includes the full MPLS label stack. Additional rules may be required in the routing table of the control plane processing part 310 to add these labels. The control plane processing part 310 thus determines the route, compiles and inserts the appropriate label stack, and determines the egress interface to be used.

This process requires a relatively large amount of state in the control plane processing part 310. Sending locally-originated control packets may occur relatively infrequently compared to the routing of customer-originated packets, which is performed at the data plane processing part 320. Further, the routes in the routing tables of the control plane processing part 310 (which may mirror those of the data plane processing part 320) may be difficult and/or inefficient for the control plane processing part 310 to manage. For example, an LDP label from a default VRF table may be used as the outer MPLS label for multiple routes in multiple customer VRFs, so a change to that label results in a large amount of required route updates, which would consume a lot of control plane processing to update if maintained locally. This can adversely affect the performance of the control plane processing part 310. The data plane processing part 320, on the other hand, may be better equipped to handle such complex routing processes, and is required to maintain the routing tables to perform routing for customer-originated traffic (and thus performs the large majority of routing overall).

Embodiments will now be described in which the control plane processing part generates control packets which are routed by the data plane processing part. This is in contrast to the case described above with reference to FIG. 3, in which the control plane processing part routes the locally-generated control packets.

Figure 4:
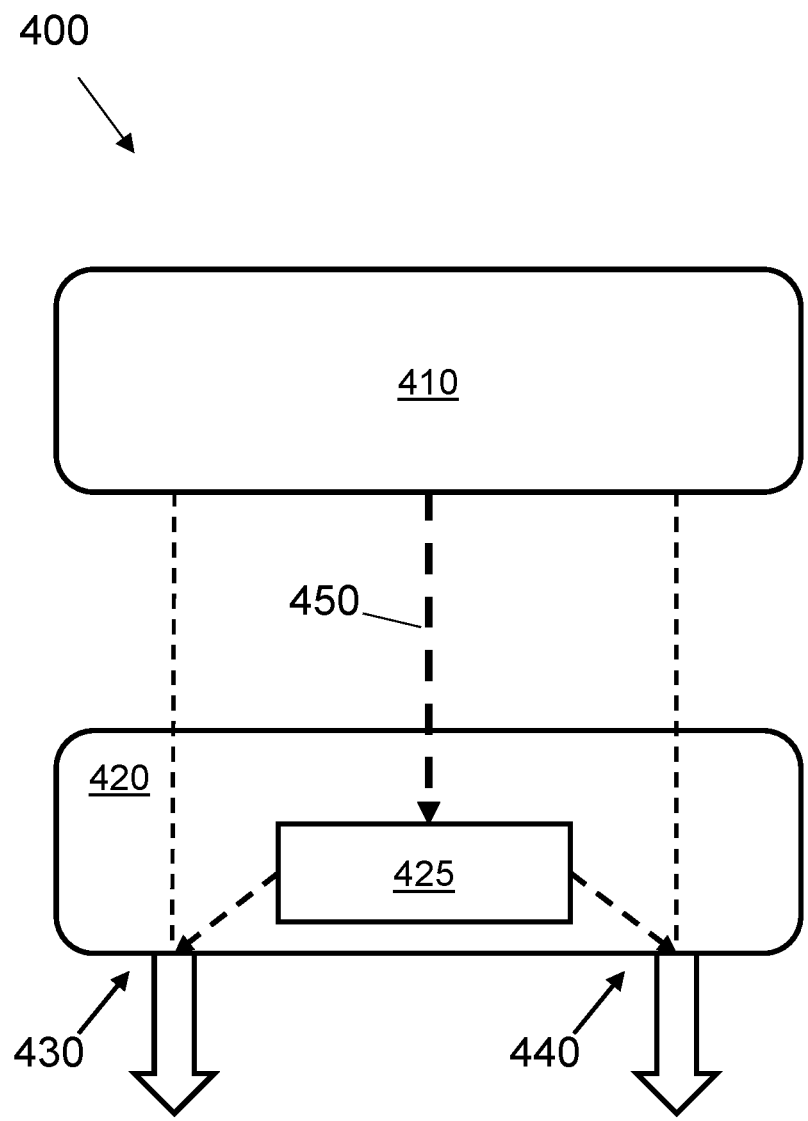
FIG. 4 shows a schematic view of a service provider network node according to embodiments of the present disclosure.

Referring to FIG. 4, there is shown schematically a service provider network node 400 according to embodiments. In embodiments, the service provider network node 400 comprises a PE node, such as the first PE node 122 or the second PE node 128 described above. In alternative embodiments, the service provider network node 400 comprises an intermediate service provider network node. Some elements of the service provider network node 400 are similar to elements described with reference to the service provider network node 300 shown in FIG. 3. Corresponding reference numerals, incremented by 100, are used for similar items.

In the embodiments shown in FIG. 4, an interface 450 is established between the control plane processing part 410 and the data plane processing part 420. The interface 450 enables routing of control packets at the data plane processing part 420, as will be described in more detail below. In embodiments, the interface 450 comprises a logical and/or functional interface. In some embodiments, the interface 450 comprises a physical interface. In some cases, the interface 450 comprises a new logical interface that is applied using an existing physical interface.

Control packets generated by the control plane processing part 410 are sent via the interface 450 to the data plane processing part 420. This causes the data plane processing part 420 to route the control packets through the service provider network using the routing tables maintained by the data plane processing part 420 in response to receiving the control packets from the control plane processing part 410 via the interface 450. In particular, the control packets received via the interface 450 are passed to the routing processing pipeline 425 of the data plane processing part 420. As such, the data plane processing part 420 is caused to route the locally-generated control packets. For example, layer 3 routing may be performed at the data plane processing part 420, instead of (or in addition to) layer 2 forwarding.

The routing processing pipeline 425 routes the control packets generated by (and received from) the control plane processing part 410, and passes the routed packets to one or more of the egress interfaces 430, 440. This is depicted using dashed arrows in FIG. 4. This enables the routed control packets to be sent through the service provider network to a desired destination.

By causing the data plane processing part to route the control packets generated by the control plane processing part, an amount of programming and/or storage resources required at the control plane processing part is reduced. In particular, the amount of state required at the control plane processing part is reduced. Further, duplication of state and/or stored data (between the control plane processing part and the data plane processing part) is reduced. For example, the control plane processing part is not required to mirror the routing tables of the data plane processing part. Additionally or alternatively, the control plane processing part is not required to compile and add the MPLS label stack, and/or is not required to determine which egress interface the control packet is to be transmitted from.

The control plane processing part is thus configured to exploit the existing functionality of the data processing part, thereby improving the overall efficiency of the service provider network node. The data plane processing part may be better equipped (e.g. in terms of dedicated hardware and/or software resources) to perform the complex routing procedures than the control plane processing part, since the data plane processing part is configured to perform similar (and in some cases identical) procedures frequently for customer-originated traffic.

The reduction in required state at the control plane processing part also enables less complex and/or expensive hardware and/or software to be used for the control plane processing part. This enables an increase in scalability of the network node. Further, since there is no requirement for the control plane processing part to manage remote VPN routes, or to reprogram routes whenever an underlying tunnel is modified, the complexity of the control plane processing part can be reduced. Moreover, by increasing the efficiency of routing and sending of control packets, such control packets (which may be for testing network connectivity, for example) may be sent with a greater frequency, thereby increasing the reliability and/or performance of the VPN.

In embodiments, the service provider network node 400 is configured to route traffic via a layer 3 VPN (L3VPN). The L3 VPN may be based on one or more of border gateway protocol/multiprotocol label switching (BGP/MPLS), Ethernet VPN/MPLS (EVPN/MPLS), and EVPN/virtual extensible local area network (EVPN/VXLAN). The L3VPN may be based on other switching and/or signalling mechanisms in alternative embodiments. In alternative embodiments, the service provider network node 400 is configured to forward traffic at layer 2, for example via a VLAN or layer 2 VPN.

In the embodiments shown in FIG. 4, the direct logical connections from the control plane processing part 410 to the existing egress interfaces 430, 440 (depicted with dashed lines) are maintained, despite the inclusion of the new interface 450. This allows for the possibility of sending a locally-generated control packet directly to one of the egress interfaces 430, 440, as will be described in more detail below.

Figure 5:
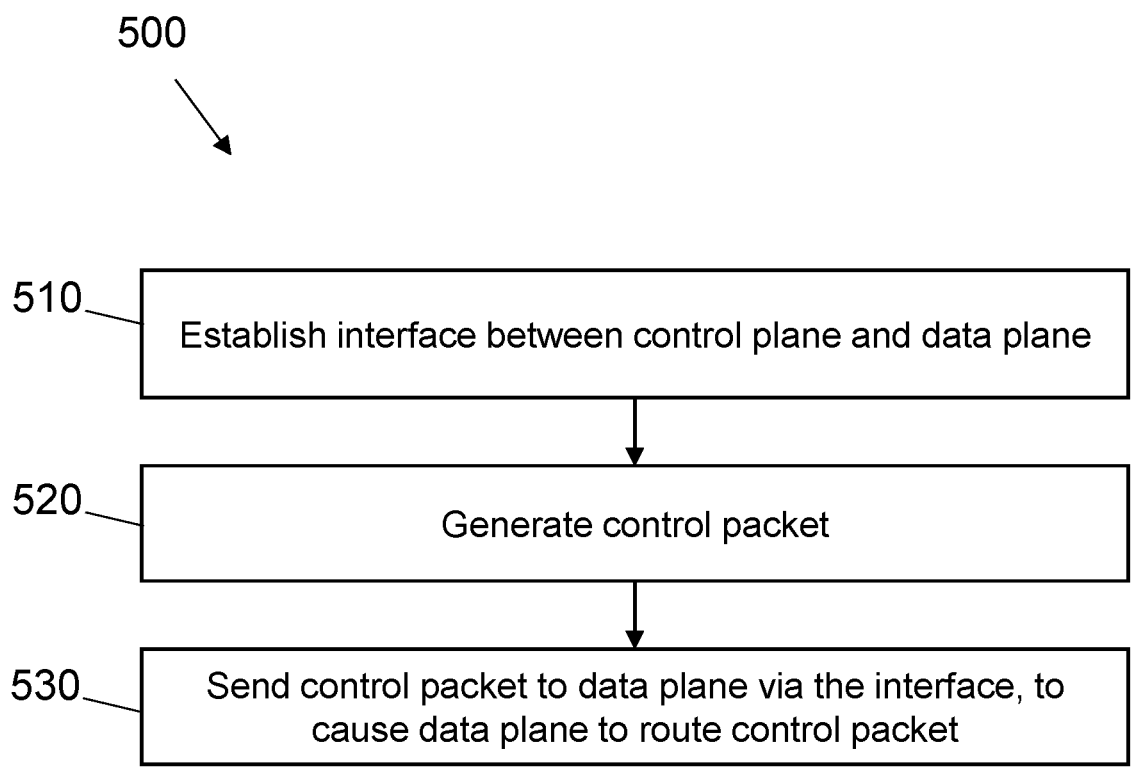
FIG. 5 shows a flow chart depicting a method of operating a service provider network node according to embodiments of the present disclosure.

Referring to FIG. 5, there is shown a method 500 of operating a service provider network node in a service provider network, according to embodiments. The service provider network node comprises a control plane processing part and a data plane processing part. The data plane processing part is operable to maintain one or more routing tables for routing traffic through the service provider network. In embodiments, the method 500 is performed at least in part by a PE node. The method 500 may be performed at least in part by the control plane processing part of the service provider network node.

At item 510, an interface is established between the control plane processing part and the data plane processing part. The interface is for routing of control packets at the data plane processing part. The interface may comprise a logical interface and/or a physical interface. The interface may comprise a kernel network interface. In embodiments, establishing the interface is performed at the control plane processing part. In alternative embodiments, establishing the interface is performed at least in part at the data plane processing part.

In embodiments, establishing the interface comprises associating a predetermined network address with a data plane end of the interface. The predetermined network address may comprise a predetermined media access control (MAC) address, as will be described in more detail below. The data plane processing part may be configured to route received control packets which indicate the predetermined network address using the routing tables maintained by the data plane processing part.

At item 520, a control packet for routing through the service provider network is generated at the control plane processing part.

In embodiments, the generated control packet is for testing network connectivity. For example, the generated control packet may be for testing connectivity and/or reachability of one or more other nodes in the service provider network and/or in a customer network that is connected to the service provider network. In embodiments, the generated control packet comprises one or more of an IP ping message and a traceroute message. The generated control packet may comprise other types of message and/or packet in alternative embodiments.

The service provider network provides connectivity between at least a first customer network node and a second customer network node. In embodiments, the second customer network node is arranged at a remote location relative to the first customer network node. The first customer network node is directly connected (e.g. logically adjacent) to the service provider network node. In such embodiments, the generated control packet is to be routed through the service provider network to the second customer network node. For example, an IP ping message is to be sent from a PE node that is directly connected to a first CE node, to a second CE node that is remote from the first CE node. Therefore, the PE node may test connectivity with nodes to which it is not directly connected, thereby providing the PE node with a more complete overview of network connectivity.

In embodiments, the second customer network node is directly connected to a further service provider network node. In such embodiments, the control packet is to be routed via the further service provider network node to the second customer network node. For example, an IP ping message is to be sent from a first PE node to a CE node that is directly connected to a second PE node, via the second PE node. This allows the first PE node to obtain a more complete overview of network connectivity.

In embodiments, the service provider network comprises at least one intermediate node between the service provider network node and the further service provider network node. In some embodiments, the service provider network comprises a plurality of intermediate nodes between the service provider network node and the further service provider network node. In some cases, each of the plurality of intermediate nodes is associated with (e.g. part of) a different route between the service provider network node and the further service provider network node. As such, a plurality of different routes through the service provider network between the service provider network node and the further service provider network node may exist.

In embodiments, a label is inserted into the generated control packet. In embodiments, the label is inserted at the control plane processing part. The label is useable by the data plane processing part to identify a routing table from the one or more routing tables and route the control packet using the identified routing table. Therefore, the control packet can be passed to the appropriate routing table (e.g. VRF table) on the data plane processing part, to enable the data plane processing part to route the control packet correctly.

In embodiments, the label inserted at the control plane processing part comprises a VRF label. The VRF label corresponds to a particular VPN, and/or to a particular VRF table maintained at the data plane processing part. As such, the VRF label is useable by the data plane processing part to identify a VRF table maintained by the data plane processing part and route the control packet using that VRF table. The control packet can thus be processed by the data processing part as if it had been received from a remote node on the corresponding VPN. Therefore, in some embodiments, the methods described herein are substantially transparent to the data plane processing part. The label inserted at the control plane processing part may comprise a label other than a VRF label in alternative embodiments. In embodiments, the label inserted at the control plane comprises an inner MPLS label, i.e. an inner label of an MPLS label stack. Inserting a VRF label into the generated control packet is less computationally expensive than determining and inserting the complete MPLS label stack (e.g. including an outer, LSP, label).

At item 530, the generated control packet is sent from the control plane processing part to the data plane processing part via the interface established at item 510. The sending of the control packet via the interface causes the data plane processing part to route the control packet through the service provider network using the one or more routing tables maintained by the data plane processing part. Therefore, the control plane processing part is not required to duplicate the routing tables of the data plane processing part, thereby reducing an amount of required state, storage and/or processing resources at the control plane processing part.

In embodiments, the data plane processing part is caused to route the received control packet using a layer 3 routing processing pipeline of the data plane processing part in response to the received control packet indicating the predetermined network address. As such, layer 3 routing of locally-generated control packets is performed at the data plane processing part instead of the control plane processing part.

In embodiments, the control plane processing part is configured to send control packets locally generated at the service provider network node via a default route. In embodiments, the default route comprises the interface established between the control plane processing part and the data plane processing part. The default route may be indicated in a routing table (e.g. a VRF table) of the control plane processing part. As such, the control plane processing part may comprise a routing table that is different from any of the one or more routing tables maintained by the data plane processing part. Instead of the control plane routing table mirroring that of the data plane processing part, the control plane routing table can contain a single default route, specifying the established interface between the control plane processing part and the data plane processing part. This uses fewer storage, state and/or processing resources than maintaining one or more routing tables which duplicate the routes stored at the data plane processing part. Further, the control plane processing part may not be required to reprogram the routes in its routing table(s) if for example an underlying network tunnel is modified, and/or to relearn the routes if for example a restart of the control plane processing part is required.

In embodiments, the data plane processing part is configured to prohibit layer 2 forwarding of the control packet received from the control plane processing part via the interface. As such, layer 2 forwarding is not performed at the data plane processing part in such embodiments. Instead, layer 3 routing is performed by the data plane processing part on the locally-generated control packet. Layer 3 routing of locally-originated control packets may be performed by the data processing part in a similar manner as that used for customer-originated packets.

In embodiments, the data plane processing part is caused to insert an LSP label into the control packet received from the control plane processing part. The data plane processing part is caused to insert the LSP label in response to receiving the control packet from the control plane processing part via the interface. Therefore, the control plane processing part is not required to determine or insert the LSP label in such embodiments, thereby reducing an amount of processing and/or state required at the control plane processing part. The data plane processing part may insert other labels and/or types of label in alternative embodiments. In embodiments, the label inserted at the data plane processing part comprises an outer MPLS label, i.e. an outer label of an MPLS label stack. Therefore, in some embodiments, the control plane processing part inserts an inner MPLS label (e.g. a VRF label indicating a particular VRF table and/or VPN), and the data plane processing part inserts an outer MPLS label (e.g. an LSP label). In some embodiments, the data plane processing part removes the label added by the control plane processing part (e.g. the VRF label). The data plane processing part may add a different VRF label for use by a further service provider network node. Therefore, the data plane processing part may add both an LSP label and a VRF label (corresponding to both inner and outer MPLS labels). In alternative embodiments, one or both of the labels inserted at the control plane processing part and the data plane processing part do not comprise MPLS labels.

In embodiments, the data plane processing part is configured with one or more ingress interfaces. Each of the one or more ingress interfaces is operable to receive packets from a respective further network node (e.g. a service provider network node or a customer network node). Different ingress interfaces may be operable to receive packets from different network nodes. The data plane processing part is configured to route packets received via the one or more ingress interfaces using the one or more routing tables maintained by the data plane processing part. That is, the same routing tables (maintained by the data plane processing part) may be used to route both locally-generated control packets received from the control plane processing part and packets received from other network nodes via the ingress interfaces. As such, the data plane processing part is caused to route the locally-generated control packet received via the established interface in a similar manner (or, in some cases, the same manner) as packets received via the one or more ingress interfaces from other network nodes. Therefore, an amount of modification of the data plane processing part is reduced, in that the data plane processing part can use similar (or the same) routing logic and/or routing tables to route remotely-generated packets and locally-generated control packets.

In some embodiments, establishing the interface comprises 'cutting into' an existing ingress interface (or pipeline) of the data plane processing part. The existing ingress interface is between a customer network node and the data plane processing part. The existing ingress interface is operable to receive traffic from the customer network node. As such, the interface established by the control plane processing part may comprise an interface between the control plane processing part and the existing ingress pipeline. The control plane processing part may insert the generated control packet into the existing ingress interface. The data plane processing part may be configured to route packets received via the existing ingress interface using a routing pipeline of the data plane processing part. Therefore, the data plane processing part may route the locally-generated control packet as if it had been received from the customer network node associated with the existing ingress interface. This process may be substantially transparent to the data plane processing part.

Figure 6:
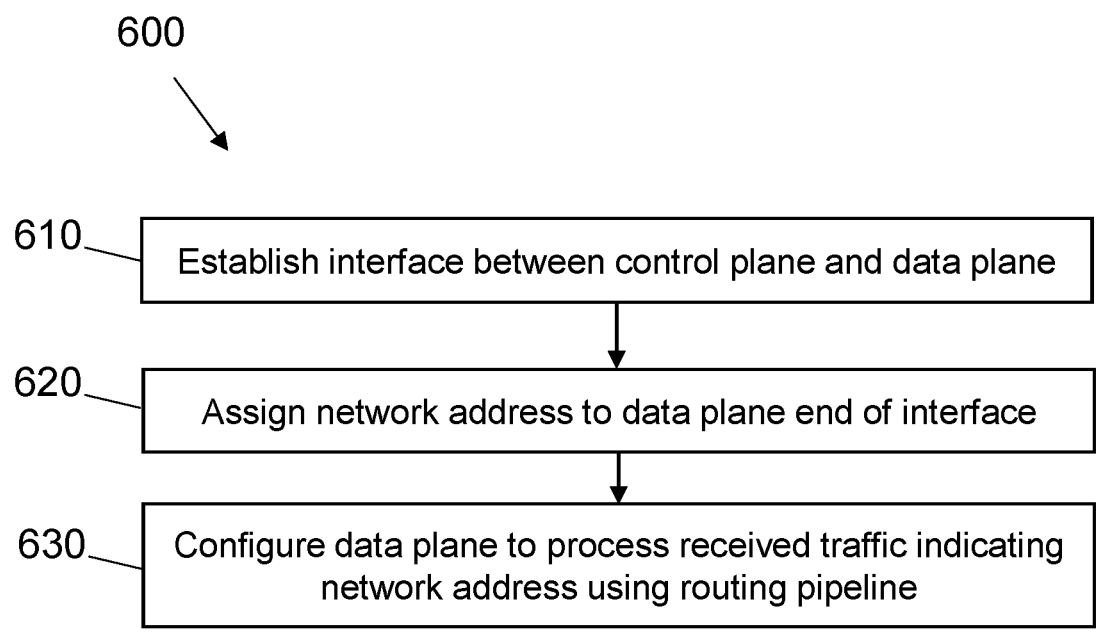
FIG. 6 shows a flow chart depicting a method of operating a service provider network node according to embodiments of the present disclosure.

Referring to FIG. 6, there is shown a method 600 of operating a service provider network node, according to embodiments. The service provider network node comprises a control plane processing part and a data plane processing part. The data plane processing part is operable to maintain one or more routing tables for routing traffic through the service provider network. In embodiments, the method 600 is performed at least in part by a PE node. The method 600 may be performed at least in part by the control plane processing part 310, 410 described with reference to FIGS. 3 and 4 above. At least part of the method 600 may be performed in combination with and/or in addition to at least part of the method 500 described with reference to FIG. 5 above.

At item 610, an interface is established between the control plane processing part and the data plane processing part. The interface is for enabling routing of control packets at the data plane processing part. The established interface may comprise a logical interface and/or a physical interface. The established interface has a control plane end and a data plane end. In embodiments, the established interface comprises a kernel network (KNET) interface.

At item 620, a predetermined network address is associated with the data plane end of the interface. In embodiments, the predetermined network address comprises a predetermined MAC address. In embodiments, the control plane end of the interface is assigned a MAC address.

At item 630, the data plane processing part is configured to route received packets which indicate the predetermined network address using a routing pipeline of the data plane processing part. Such received packets may comprise a destination field (e.g. in a header of the packet) indicating the predetermined network address. In embodiments, a rule is created for the network address of the data plane end of the established interface. Such a rule causes packets received from the control plane processing part to be processed using layer 3 routing instead of layer 2 forwarding. Therefore, the control plane processing part can generate a control packet, assign the predetermined network address to a destination field of the control packet, and send the control packet via the established interface, to cause the data plane processing part to use its routing pipeline to route the control packet through the service provider network. The data plane processing part routes the locally-originated control packet as if it had been received from a remote node.

In embodiments, a VLAN identifier is associated with the established interface (e.g. 4093). A private IPv4 address (e.g. 169.254.0.1) and/or a private IPv6 address may also be assigned to the established interface. The selected IP addresses may be reserved IP addresses, according to embodiments. At the control plane processing part, the private IP addresses are mapped to the MAC address of the data plane end of the interface. Such mappings may be obtained using address resolution protocol (ARP) entries, e.g. in an IP neighbour table on the control plane processing part. These mappings allow the control plane processing part to send locally-generated control packets to the data plane processing part.

In embodiments, a default IPv4 route and/or a default IPv6 route may be added to a VRF table of the control plane processing part. For this default route, the private IPv4 address is the next hop IP address. This maps via the static ARP entry to the MAC address of the data plane end of the interface. As such, the control plane processing part is configured with a default route which sends packets via the interface to the data plane processing part. Further, the default route includes pushing an MPLS label (e.g. a VRF label) associated with the local VRF. This enables the data plane processing part to identify one of its VRF tables to perform routing. For example, the VRF table of the control plane processing part may have a single default route: "0.0.0.0/0 via 'cpu', (VRF) label", where 'cpu' is the name assigned to the established interface, and the correct VRF label is to be inserted. This default route indicates that the next hop is the 'cpu' interface, rather than a remote node.

Figure 7:
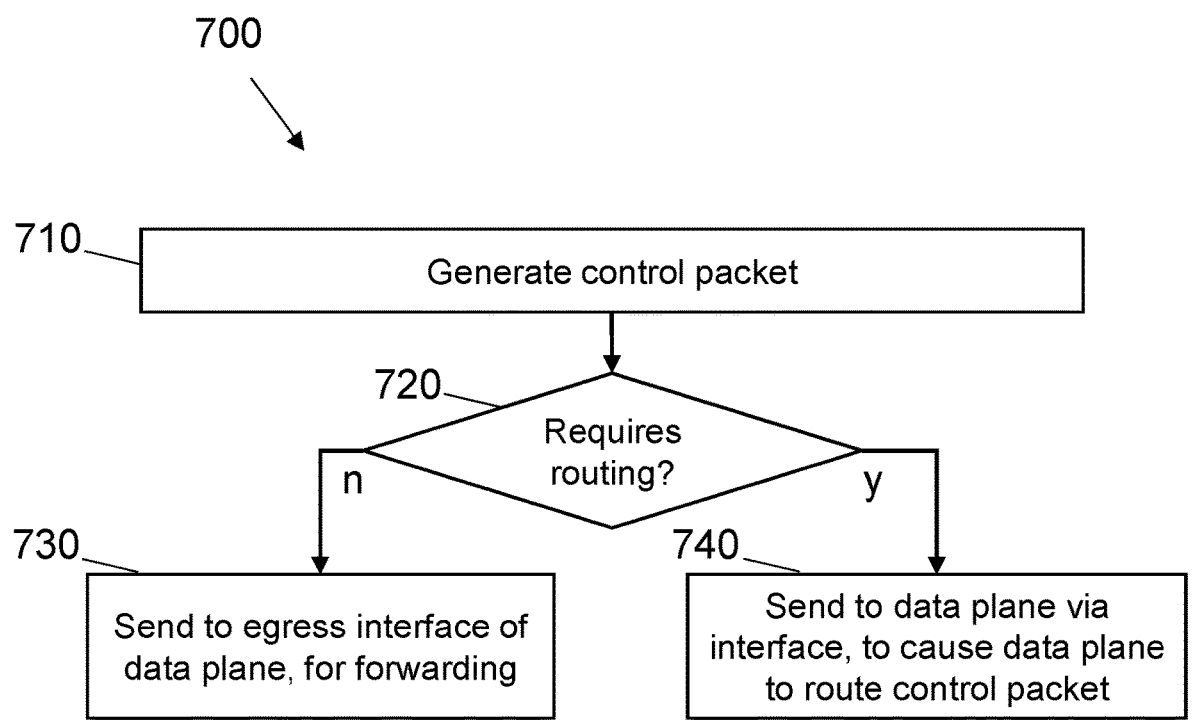
FIG. 7 shows a flow chart depicting a method of operating a service provider network node according to embodiments of the present disclosure.

Referring to FIG. 7, there is shown a method 700 of operating a service provider network node, according to embodiments. The service provider network node comprises a control plane processing part and a data plane processing part. The data plane processing part is operable to maintain one or more routing tables for routing traffic through the service provider network. In embodiments, the method 600 is performed at least in part by a PE node. The method 600 may be performed at least in part by the control plane processing parts 310, 410 described with reference to FIGS. 3 and 4 above. At least part of the method 700 may be performed in combination with and/or in addition to at least part of the method 500 described with reference to FIG. 5 and/or at least part of the method 600 described with reference to FIG. 6. In some embodiments, where the method 500 is performed in relation to a first control packet, the method 700 may be performed in relation to a further control packet.

At item 710, a control packet is generated at the control plane processing part.

At item 720, it is determined whether the control packet is to be sent via the interface established between the control plane processing part and the data plane processing part. Such a determination may be based on a desired destination of the control packet. Such a determination may involve determining whether the control packet requires routing (or relatively complex routing) to be performed. The desired destination of the control packet may comprise a network node that is logically adjacent (i.e. directly connected to) the service provider network node. For example, if the desired destination of the control packet is a node that is logically adjacent to the service provider network node, relatively complex routing may not be required. If, on the other hand, the control packet is intended for a node that is not logically adjacent to the service provider network node (e.g. where there are one or more intermediate nodes and/or one or more possible routes to the destination node), relatively complex routing may be required.

At item 730, if it is determined that routing (or relatively complex routing) is not required, the control packet is sent directly to an existing egress interface of the data plane processing part, for forwarding via the existing egress interface. It may be more efficient for the control plane processing part to send such packets directly to an existing egress interface, instead of sending the packets via the interface between the control plane processing part and the data plane processing part for routing by the data plane processing part.

In embodiments, the control plane processing part determines which existing egress interface of the data plane processing part to send the control packet to, based on the desired destination of the control packet. For example, different logically adjacent nodes may be associated with different egress interfaces of the data plane processing part.

At item 740, if it is determined that routing (or relatively complex routing) is required, the control packet is sent to the data plane processing part via the established interface between the control plane processing part and the data plane processing part. The data plane processing part, in response to receiving the control packet via the interface, is caused to route the control packet using a routing table maintained by the data plane processing part. Performing the routing of such control packets at the data plane processing part, which is configured to perform such routing for customer-originated packets, is more efficient than performing the routing at the control plane processing part.

The determination of whether to send the locally-generated control packet via the interface between the control plane processing part and the data plane processing part, or to send the control packet directly to an existing egress interface of the data plane processing part, may be based on other factors in alternative embodiments. For example, a first type of control packet may be sent via the interface to be routed by the data plane processing part, and a second type of control packet may be sent directly to an existing egress interface of the data plane processing part, such that the data plane processing part does not perform routing of the second type of control packet. In some cases, all control packets are sent via the interface between the control plane processing part and the data plane processing part, for routing by the data plane processing part.

The service provider network nodes 300, 400, control plane processing parts 310, 410, and/or data plane processing parts 320, 420 as described above may be comprised in or implemented in apparatus comprising a processor or processing system. The processing system may comprise one or more processors and/or memory. Each device, module, component, machine or function as described in relation to any of the examples described herein, for example the control plane processing parts 310, 410 or service provider network nodes 300, 400 may similarly comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments described herein, the service provider network provides a layer 3 VPN. In alternative embodiments, the methods described herein are implemented as part of layer 2 switching. For example, the control plane processing part may insert a VLAN tag to the generated control packet, instead of (or in addition to) a VRF label. The data plane processing part may store an Ethernet switching table for a given VLAN (identifiable using a VLAN tag), which includes MAC addresses for that VLAN. The data plane processing part may also store layer 2 switching logic for the VLAN. The layer 2 switching logic may selectively block ports or VLANs on ports, based on the output of one or more of a spanning tree protocol (STP), rapid spanning tree protocol (RSTP), multiple spanning tree protocol (MSTP) and Ethernet ring protection switching (ERPS). The control plane processing part may be unable to perform such selective port blocking. The control plane processing part sends a control packet to the data plane processing part via the established interface between the control plane processing part and the data plane processing part, to cause the data plane processing part to perform layer 2 switching of the locally-generated control packet. Therefore, layer 2 switching using a spanning tree protocol may be performed for locally-generated control packets. This may be implemented, for example, in the context of an integrated routing and bridging (IRB) process.

In embodiments, the service provider network node uses VRF tables to provide a layer 3 VPN. In alternative embodiments, VRF tables are used in other (e.g. non-VPN) scenarios. The techniques of embodiments described herein may be used in such other scenarios (e.g. to cause a data plane to route locally-generated control packets).

In embodiments, the control plane processing part inserts a label into a generated control packet to identify a routing table at the data plane processing part. In alternative embodiments, the control plane processing part does not insert such a label. In such embodiments, for example, the data plane processing part may comprise a single and/or default routing table.

In embodiments, a MAC address is assigned to the data plane end of the established interface between the control plane processing part and the data plane processing part. In alternative embodiments, an address other than a MAC address is used. In some alternative embodiments, no predetermined network address is associated with the data plane end of the interface. In some alternative embodiments, the data plane processing part does not route the received control packet on the basis of the packet indicating a predetermined network address (e.g. a predetermined MAC address). In such alternative embodiments, the data plane processing part may route the received control packet on the basis of the packet having been received via a particular existing ingress interface of the data plane processing part.

In embodiments, the generated control packet is to be routed through the service provider network to a customer network node (e.g. for testing connectivity between a PE node and a CE node that is not directly connected to the PE node). In alternative embodiments, the generated control packet is to be routed through the service provider network to a further service provider network node (e.g. for testing connectivity between a first PE node and a second, different, PE node). As such, the desired destination of the control packet may be a node other than a customer network node in such alternative embodiments. The further service provider network node may be directly or indirectly connected to the service provider network node.

In embodiments, the control plane processing part is configured with a default route for sending packets locally generated at the service provider network node, the default route comprising the established interface. In alternative embodiments, the control plane processing part is configured with a default route other than the established interface. That is, the established interface may represent a non-default route for the control plane processing part. In some embodiments, the control plane processing part is not configured with a default route for locally-originated packets.

In embodiments, the data plane processing part inserts an LSP label into the control packet received from the control plane processing part. In alternative embodiments, the data plane processing part inserts a different label into the control packet. In some alternative embodiments, the data plane processing part does not insert any labels into the control packet. For example, the control plane processing part may insert such labels in some embodiments.

In embodiments, the control plane processing part determines whether to send a locally-generated control packet via the interface established for routing at the data plane processing part, or directly to an existing egress interface of the data plane processing part for forwarding via the existing egress interface. In alternative embodiments, the control plane processing part sends all control packets via the interface established for routing at the data plane processing part. For example, control packets that are to be sent to logically adjacent network nodes may be routed by the data plane processing part.

Embodiments comprise measures, including methods, apparatuses and computer program products, for a service provider network node in a service provider network. The service provider network provides connectivity between at least a first customer network node and a second customer network node of a customer network. The service provider network node comprises a control plane processing part, and a data plane processing part, separate from the control plane processing part, the data plane processing part being operable to maintain one or more routing tables for routing traffic through the service provider network. The control plane processing part is configured to establish an interface between the control plane processing part and the data plane processing part for routing of control packets at the data plane processing part. The control plane processing part is further configured to generate a control packet for routing through the service provider network. The control plane processing part is also configured to send the control packet to the data plane processing part via the interface. The data plane processing part is configured to, in response to receiving the control packet from the control plane processing part via the interface, route the control packet through the service provider network using the one or more routing tables maintained by the data plane processing part.

Embodiments comprise measures, including methods, apparatus and computer program products, for use in operating a service provider network node in a service provider network. The service provider network provides connectivity between at least a first customer network node and a second customer network node of a customer network. The service provider network node comprises a control plane processing part, and a data plane processing part, separate from the control plane processing part, the data plane processing part being operable to maintain one or more routing tables for routing traffic through the service provider network. At the control plane processing part, a control packet is generated, for routing through the service provider network. At the control plane processing part, the control packet is sent to the data plane processing part via an interface between the control plane processing part and the data plane processing part, to cause the data plane processing part to route the control packet through the service provider network using the one or more routing tables maintained by the data plane processing part in response to receiving the control packet from the control plane processing part via the interface. The control packet is inserted by the control plane processing part into an existing ingress interface between the first customer network node and the data plane processing part. The existing ingress interface is operable to receive traffic from the first customer network node.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of operating a service provider network node in a service provider network, the service provider network providing connectivity between at least a first customer network node and a second customer network node of a customer network, the service provider network node comprising:
    a control plane processing part; and
    a data plane processing part, separate from the control plane processing part,
    the method comprising:
    storing, by the data plane processing part, one or more routing tables for routing traffic through the service provider network,
    at the control plane processing part, generating a control packet for routing through the service provider network between the first customer network node and the second customer network node;
    sending, by the control plane processing part, the control packet to the data plane processing part via an egress interface for routing of locally generated control packets to the data plane processing part; and
    in response to receiving the control packet, routing, by the data plane processing part, the control packet through the service provider network using the one or more routing tables stored by the data plane processing part.

2. The method according to claim 1, further comprising, at the control plane processing part, inserting a label into the generated control packet, the label being useable by the data plane processing part to identify a routing table from the one or more routing tables and route the control packet using the identified routing table.

3. The method according to claim 2, wherein the label comprises a virtual routing and forwarding (VRF) label corresponding to a particular virtual private network (VPN).

4. The method according to claim 1, further comprising associating a predetermined network address with a data plane end of the interface between the control plane processing part and the data plane processing part, and
wherein the predetermined network address comprises a predetermined media access control (MAC), address.

5. The method according to claim 4, wherein the data plane processing part is caused to route the received control packet using a layer 3 routing processing pipeline of the data plane processing part in response to the received control packet indicating the predetermined network address.

6. The method according to claim 1,
wherein the second customer network node is arranged at a remote location relative to the first customer network node,
wherein the first customer network node is directly connected to the service provider network node, and
wherein the generated control packet is to be routed through the service provider network to the second customer network node.

7. The method according to claim 6, wherein the second customer network node is directly connected to a further service provider network node, and wherein the generated control packet is to be routed via the further service provider network node to the second customer network node, and
wherein the service provider network comprises at least one intermediate node between the service provider network node and the further service provider network node.

8. The method according to claim 1, further comprising configuring the control plane processing part to send control packets locally generated at the service provider network node via a default route, the default route comprising the interface established between the control plane processing part and the data plane part.

9. The method according to claim 1, wherein the data plane processing part is configured to prohibit layer 2 forwarding of the control packet received from the control plane processing part via the interface.

10. The method according to claim 1, wherein the generated control packet is for testing network connectivity, and
wherein the generated control packet comprises one or more of an internet protocol (IP) ping message and a traceroute message.

11. The method according to claim 2, wherein the data plane processing part is caused to insert a label-switched path (LSP) label into the control packet received from the control plane processing part in response to receiving the control packet from the control plane processing part via the interface, and
wherein the label inserted at the control plane processing part comprises an inner multiprotocol label switching (MPLS) label, and wherein the label inserted at the data plane processing part comprises an outer MPLS label.

12. The method according to claim 1, further comprising, at the control plane processing part:
generating a further control packet;
determining, based on a desired destination of the further control packet, whether the further control packet is to be sent via the egress interface; and in response to determining that the further control packet is not to be sent via the egress interface, sending the further control packet to an existing interface of the data plane processing part, for forwarding via the existing interface.

13. The method according to claim 12, further comprising, at the control plane processing part, determining the existing interface of the data plane processing part based on the desired destination of the further control packet, wherein the desired destination of the further control packet comprises a network node that is logically adjacent to the service provider network node.

14. The method according to claim 1,
wherein the data plane processing part is configured with one or more ingress interfaces, each of the one or more ingress interfaces being operable to receive packets from a respective further network node, and
wherein the data plane processing part is configured to route packets received via the one or more ingress interfaces using the one or more routing tables maintained by the data plane processing part.

15. The method according to claim 1, wherein the service provider network node comprises a provider edge (PE) node,
wherein the one or more routing tables comprise one or more virtual routing and forwarding (VRF) tables, and
wherein the first customer network node or the second customer network node comprises a customer edge (CE) node.

16. A system comprising:
at least one processor; and
at least one memory including computer program code, the at least one memory and the computer program code being configured to, with the at least one processor, cause the system at least to perform operations for operating a service provider network node in a service provider network, the service provider network providing connectivity between at least a first customer network node and a second customer network node of a customer network, the service provider network node comprising:
a control plane processing part; and
a data plane processing part, separate from the control plane processing part,
the operations comprising:
storing one or more routing tables for routing traffic through the service provider network,
at the control plane processing part, generating a control packet for routing through the service provider network between the first customer network node and the second customer network node;
sending, by the control plane processing part, the control packet to the data plane processing part via an egress interface for routing of locally generated control packets to the data plane processing part and
in response to receiving the control packet, routing, by the data plane processing part, the control packet through the service provider network using the one or more routing tables stored by the data plane processing part.

17. The system according to claim 16, wherein the control plane processing part comprises a routing table that is different from any of the one or more routing tables maintained by the data plane processing part.

18. The system according to claim 16, wherein the control plane processing part and the data plane processing part are implemented on separate processors of the service provider network node.

19. The system according to claim 16, wherein the service provider network node is configured to route traffic via a layer 3 virtual private network (L3VPN) and
wherein the L3VPN is based on one or more of border gateway protocol/multiprotocol label switching (BGP/MPLS) Ethernet VPN/MPLS (EVPN/MPLS) and EVPN/virtual extensible local area network (EVPN/VXLAN).

20. A computer program product comprising a non-transitory computer-readable storage medium having computer-readable instructions stored thereon, the computer-readable instructions being executable by a computerized device to cause the computerized device to perform operations for operating a service provider network node in a service provider network, the service provider network providing connectivity between at least a first customer network node and a second customer network node of a customer network, the service provider network node comprising:
a control plane processing part; and
a data plane processing part, separate from the control plane processing part,
the operations comprising:
storing one or more routing tables for routing traffic through the service provider network,
at the control plane processing part, generating a control packet for routing through the service provider network between the first customer network node and the second customer network node;
a sending, by the control plane processing part, the control packet to the data plane processing part via an egress interface for routing of locally generated control packets to the data plane processing part and
in response to receiving the control packet, routing, by the data plane processing part, the control packet through the service provider network using the one or more routing tables stored by the data plane processing part.

21. A service provider network node in a service provider network, the service provider network providing connectivity between at least a first customer network node and a second customer network node of a customer network, the service provider network node comprising:
a control plane processing part; and
a data plane processing part, separate from the control plane processing part, the data plane processing part being operable to maintain one or more routing tables for routing traffic through the service provider network,
the control plane processing part configured to:
generate a control packet for routing through the service provider network between the first customer network node and the second customer network node; and
send the control packet to the data plane processing part via an egress interface for routing of locally generated control packets to the data plane processing part,
the data plane processing part configured to:
in response to receiving the control packet from the control plane processing part via the egress interface, route the control packet through the service provider network using the one or more routing tables maintained by the data plane processing part.

22. A method of operating a service provider network node in a service provider network, the service provider network providing connectivity between at least a first customer network node and a second customer network node of a customer network, the service provider network node comprising:
a control plane processing part; and
a data plane processing part, separate from the control plane processing part, the data plane processing part being operable to maintain one or more routing tables for routing traffic through the service provider network,
the method comprising:
at the control plane processing part, generating a control packet for routing through the service provider network between the first customer network node and the second customer network node; and
at the control plane processing part, sending the control packet to the data plane processing part via an interface for routing of locally generated control packets to the data plane processing part, wherein the control packet is inserted into an existing ingress interface between the first customer network node and the data plane processing part, the existing ingress interface being operable to receive traffic from the first customer network node;
in response to receiving the control packet, routing, by the data plane processing part, the control packet through the service provider network using the one or more routing tables maintained by the data plane processing part.

* * * * *